March 25, 1930. J. T. LUCAS 1,751,554
METER TESTING APPARATUS
Filed Jan. 12, 1924 2 Sheets-Sheet 1

INVENTOR
JOHN T. LUCAS
BY Paul, Paul & Moore
ATTORNEYS

March 25, 1930.  J. T. LUCAS  1,751,554
METER TESTING APPARATUS
Filed Jan. 12, 1924    2 Sheets-Sheet 2
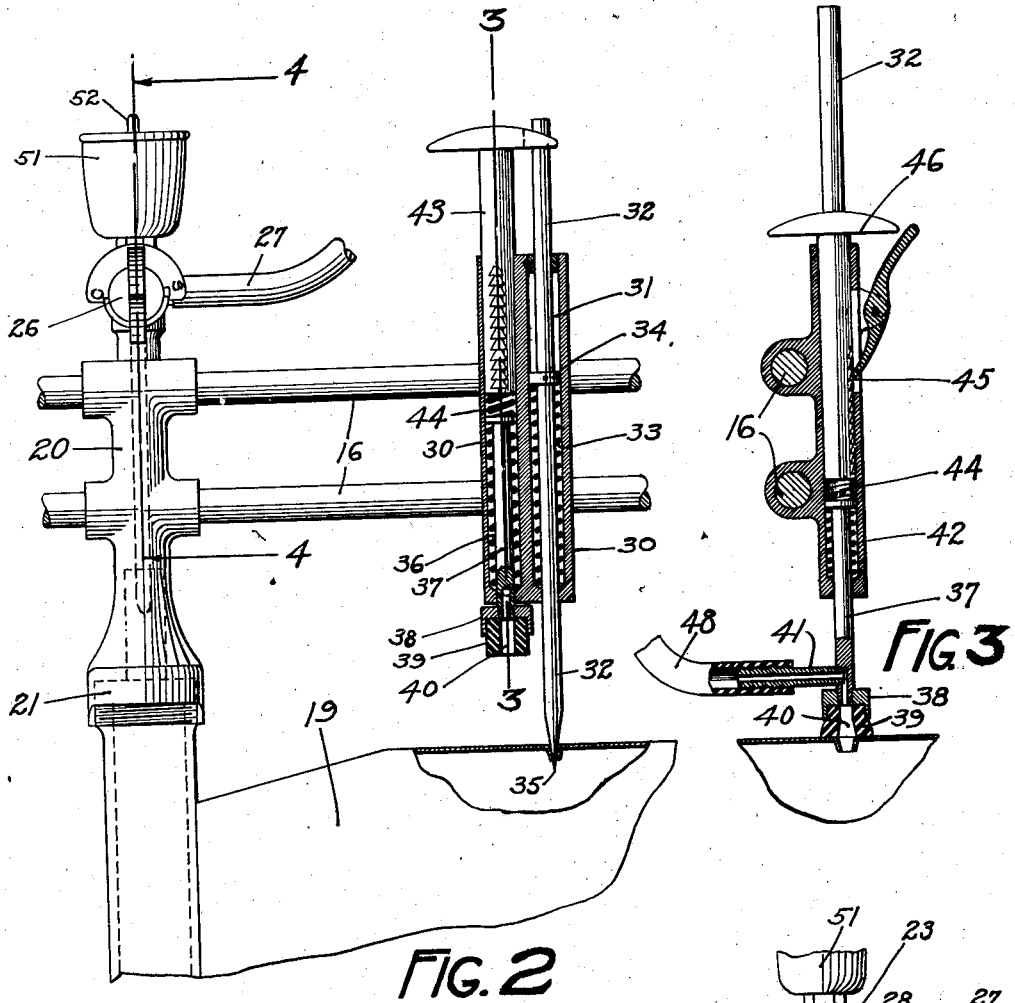
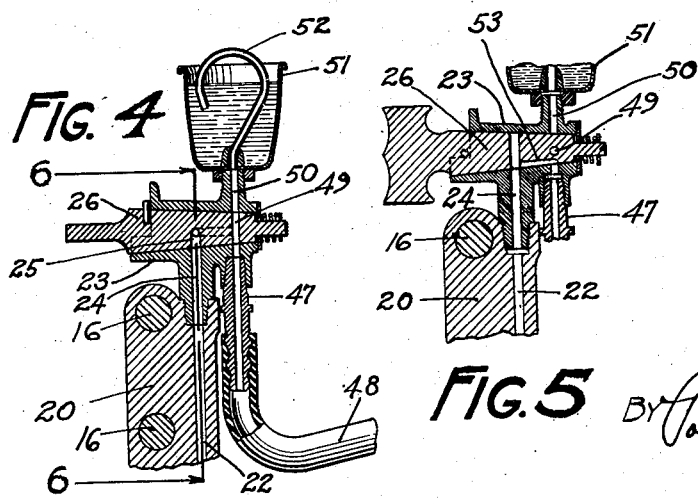
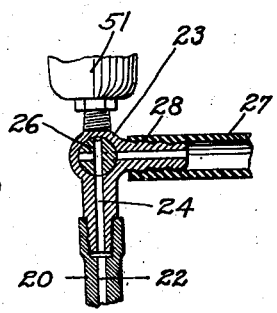
INVENTOR
JOHN T. LUCAS
BY
ATTORNEYS Patented Mar. 25, 1930

1,751,554

UNITED STATES PATENT OFFICE

JOHN T. LUCAS, OF MINNEAPOLIS, MINNESOTA, ASSIGNOR TO AMERICAN METER COMPANY, INCORPORATED, OF NEW YORK, N. Y., A CORPORATION OF DELAWARE

METER-TESTING APPARATUS

Application filed January 12, 1924. Serial No. 685,836.

One object of my invention is to improve and extend the application of apparatus of the type shown and described in Letters Patent of the United States, issued to F. C. Shepard and J. T. Lucas, January 7, 1913, #1,049,541.

A further and particular object of the invention is to provide means whereby the gallery or the chamber in the upper part of the meter can be tested to determine if there is a leak in the wall separating the gallery from the chamber of the meter proper, and also to determine if there is a leak in the outer casing or wall of the gallery.

Other objects of the invention will appear from the following detailed description and the accompanying drawings and will be pointed out in the annexed claims.

In the accompanying drawings forming part of this specification,

Figure 2 is a detail view partially in section illustrating one of the steps in the gallery test;

Figure 3 is a detail sectional view on the line 3—3 of Figure 2, showing the manner of adjusting the device for admitting air to the gallery;

Figure 4 is a detail sectional view on the line 4—4 of Figure 2, showing the manner of delivering air to the bubble test cup;

Figure 5 illustrates the valve for controlling the flow of air to the cup and to the gallery;

Figure 6 is a detail sectional view on the line 6—6 of Figure 4, showing the air connections with the valve; the valve being shown in normal or closed position;

Figures 1, 7:
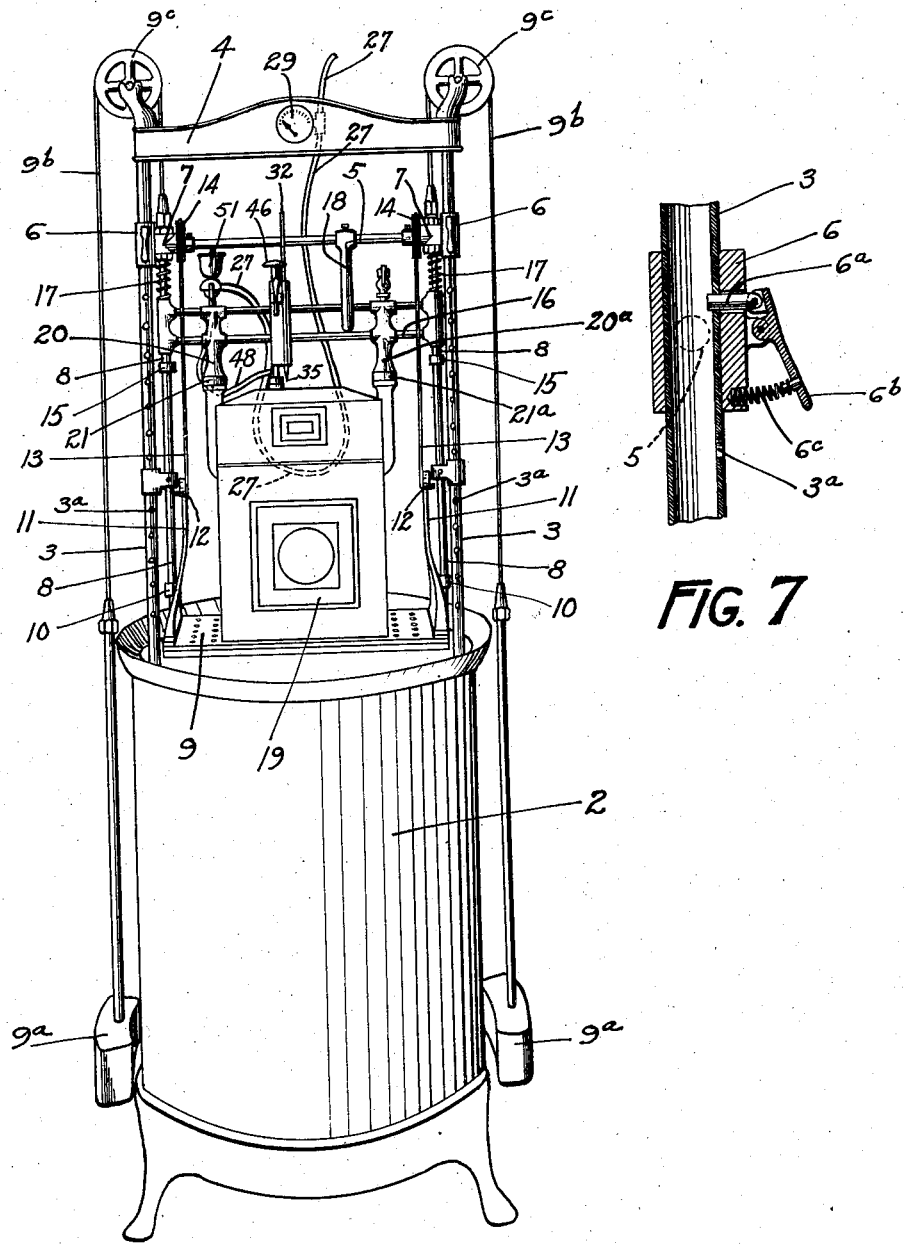
Figure 1 is a front elevation of a meter testing apparatus embodying my invention.
Figure 7 is a detail sectional view showing the means for locking the meter carrier in its adjusted positions.

In the drawing, 2 represents a suitable tank having an open top adapted to contain a quantity of water. 3 are upright rods extending preferably to the bottom of the tank and connected at the top with one another by a suitable cross-bar 4. A meter carrier is vertically slidable on the rods 3 and comprises a cross-rod 5 having guides 6 at each end which are slidable on the rods 3. Between the cross-bar 5 and the guides 6, fittings 7 are provided having bearings in which the cross-rod 5 is adapted to rotate, and supporting vertically arranged rods 8. A carrier platform 9 has guides 10 slidable on the rods 8, and straps 11 are connected to said platform and have adjustable connections at 12 with rods 13 which extend to eccentrics 14 on the rod 5. Stops 15 are mounted on the rods 8 and a cross head 16 is slidable on said rods and is normally seated against the stops 15 by the tension of compression springs 17 mounted on the rods 8 between the cross head and the fittings 7 on the rod 5. An operating lever 18 is mounted on said rod for rotating it and the eccentrics to draw up the meter platform and the meter thereon against the tension of the springs 17. The meter 19 to be tested is interposed between the cross head and the platform, and fittings for delivering air to the meter are mounted on the cross head and correspond substantially to the fittings shown and described in the patent above referred to and particularly Figure 4 of said patent. These fittings I will designate by reference numeral 20 and 20$^a$ and the cups for connecting the fittings with the meter by numeral 21 and 21$^a$.

The rods 3 have holes 3$^a$ therein at suitable intervals and the guides 6 have pins 6$^a$ adapted to enter said holes and lock the carrier positively at the desired elevation on the guide rods, said pins being released by means of levers 6$^b$ having springs 6$^c$ for normally holding the levers and pins in their locking position. Whenever desired, the operator may grasp these levers, disengage the pins from the holes and move the carrier vertically on the guide rods. To facilitate movement of the carrier, I also provide counterbalance weights 9$^a$ having cables 9$^b$ passing over sheaves 9$^c$ and connecting the weights with the carrier and operating to counterbalance the weight of the same.

For the purpose of supplying air to the meter for testing purposes, the fitting 20 is provided with an air duct 22, and a valve casing 23 has a duct 24 therein to register with the duct 22 and with a port 25 in a rotating plug valve 26 mounted in the casing 23 for controlling the fluid pressure. An air line pipe 27 has a connection at 28 with the valve 26 and when the valve is adjusted in the position shown in Figure 4, air pressure will be admitted through the fittings to the lower meter chamber; the pipe 27 leading to a source of air supply and having a suitable gauge 29. To this extent, the apparatus corresponds substantially to the one shown in the patent above referred to. In this patent, however, there is no provision for testing the gallery or chamber in the upper part of the meter for leaks and I have therefore provided an adjunct or member for this purpose which I will now describe in detail.

30 represents a casing mounted on the cross heads 16 and adapted to slide back and forth thereon to adjust it over the meter to be tested. A chamber 31 is provided in this casing and a pin 32 is slidable in this chamber and has a compression spring 33 thereon interposed between the lower wall of the chamber and a collar 34 secured on said pin. Normally this pin is held in a raised position by the tension of the spring. The lower end of the pin has a sharp point 35 that is adapted to puncture or pierce the top wall of the gallery preliminary to the testing operation, making a fine perforation therein. The casing 30 is also provided with a chamber 36 and a plunger 37 is slidable in said chamber and has a cup 38 at its lower end wherein a block 39 of yielding material is mounted and provided with a port 40 that is adapted to register with the perforation in the wall of the meter and communicates with a nipple 41 secured to the plunger 37 adjacent the cup 38. A compression spring 42 normally holds the plunger in its raised position. In the upper part of the casing, a second plunger 43 is mounted and a cushion spring 44 is interposed between the lower end of the second plunger and the upper end of the lower plunger. Said second plunger is provided with a ratchet locking device 45 by means of which the plunger is held in its down position. The upper end of the second plunger preferably has a head 46 thereon for convenience in striking it and forcing it down against the tension of the springs to seat the cup 39 firmly on the surface of the meter wall. This is done after the puncture has been made by the operation of the pin 32, and when the pin has been withdrawn and the casing 30 moved over to register the port 40 of block 39 with the perforation in the wall of the gallery. The valve casing 23 has a nipple 47 and a pipe section 48 connects the nipples 41 and 47 and the valve 26 has a port 49 that is adapted to register with the passage in the nipple 47 and a duct 50 leading to a bubble test cup 51 that is adapted to contain a supply of oil, and a small coiled pipe 52 leads upwardly from the passage 50 and has its open end terminating within the body of oil in the cup so that if there is a flow of air through the connections and the valve to the cup, bubbles will be formed and indicate to the observer that air is escaping from the gallery. This flow or escape of air from the gallery would indicate that there was a leak in the wall or possibly in the valves between the gallery and the main portion of the meter to which air has been admitted through the fitting 20 and the duct 22. This wall being concealed within the meter, any leak therein would not be detected when the meter is submerged in the water in the tank as none of its surface would be exposed to contact with the water and I have found in practice that leaks in this wall between the gallery and the lower portion of the meter would remain undetected when a meter has been subjected to the test of the apparatus shown and described in the patent above referred to. With my improvement, however, if there is any air escaping into the gallery from the main portion of the meter that is subjected to internal air pressure, it will flow out through the puncture in the wall to the oil in the test cup and cause the formation of bubbles therein and indicate to the observer the existence of such a leak.

It is also desirable to test the outer walls of the gallery for air leaks and I therefore provide the valve 26 with a longitudinal duct 53 arranged to form a communicating passage between the duct 24 and the nipple 47. When the valve is adjusted, as shown in Figure 5, the cup 51 will be cut off from communication with the nipple 47, and air will be admitted through the duct 22 to the lower portion of the meter and also through the nipple 47, pipe 48, and connection 39 to the interior of the gallery. When this has been done, the entire meter will be submerged in the water as described in the patent above referred to and the test for leaks in the outer walls be made in substantially the manner described in said patent. If no leak is discovered the connection is removed from the puncture and the orifice closed by a drop of solder or other suitable means.

I claim as my invention:

1. Meter testing apparatus comprising a conduit for supplying fluid under pressure to one chamber of a meter, a second conduit having one end adapted to communicate with the interior of another chamber of the meter, means for indicating the presence of fluid pressure at the other ends of said second conduit, and a manually controlled valve operatively positioned between said conduits.

2. Meter testing apparatus comprising a conduit for supplying fluid under pressure to one chamber of a meter, a second conduit having one end adapted to communicate with the interior of another chamber of the meter, means for indicating the presence of fluid pressure at the other end of said second conduit, and a manually controlled valve operatively positioned between said second conduit and said indicating means.

3. Meter testing apparatus comprising a conduit for supplying fluid under pressure to one chamber of a meter, a second conduit having one end adapted to communicate with the interior of another chamber of the meter, means for indicating the presence of fluid pressure at the other end of said second conduit, a manually controlled valve having a port operatively positioned to afford communication between said conduits and a port operatively positioned to afford communication between said second conduit and said indicating means.

4. Meter testing apparatus comprising a first conduit for supplying fluid under pressure to one chamber of a meter, means for indicating the presence of fluid pressure in another chamber of the meter, a second conduit adapted to communicate with the interior of said other chamber and with said indicating means, and manually operable means for effecting communication between said second conduit and said pressure indicating means or said first conduit at will while preventing communication between said first conduit and said pressure indicating means.

5. Meter testing apparatus comprising a support for a meter to be tested, a sealing head mounted on said support for transverse and longitudinal adjustment with respect thereto, and means operable independently of the movement of said support interposed between said head and said support for retaining said sealing head in compressed relation between the support and a wall of a meter being tested.

6. The combination with a meter support and a conduit for supplying fluid under pressure to the lower chamber of a meter supported thereon, of a second conduit having means at one end for indicating the presence of fluid pressure therein, and a sealing head at the other end, means cooperating with the meter support to retain said head in effective engagement with a wall of a meter, and means operatively positioned between said conduits for admitting air under pressure from said first conduit to said sealing head and for obstructing communication between said first conduit and said pressure indicating means.

7. Testing apparatus for a meter having two chambers and a wall between said chambers said apparatus comprising a conduit for supplying fluid under pressure to one of said chambers, a second conduit having one end adapted to communicate with the interior of said other chamber, and means at the other end of said second conduit for indicating the presence of fluid pressure in said other chamber.

8. Testing apparatus for a meter having two chambers and a wall between said chambers said apparatus comprising a conduit for supplying fluid under pressure to one of said chambers, a second conduit having one end adapted to communicate with the interior of said other chamber, means at the other end of said second conduit indicating the presence of fluid pressure in said other chamber, a connecting conduit operatively positioned between said first and second mentioned conduits, and a valve operatively positioned in controlling relation to said connecting conduit.

9. Testing apparatus for a meter having two chambers and a wall between said chambers said apparatus comprising a conduit for supplying fluid under pressure to one of said chambers, a second conduit having one end adapted to communicate with the interior of said other chamber, means at the other end of said second conduit for indicating the presence of fluid pressure in said other chamber, a connecting conduit operatively positioned between said first and second mentioned conduits, means for obstructing the passage of fluid under pressure through said connecting conduit, and means for permitting the passage of fluid under pressure from said second mentioned conduit to the pressure indicating means while said obstructing means is in effective passage obstructing position with respect to said connecting conduit.

10. The method of testing a meter having an upper chamber, a lower chamber and a wall between said chambers which includes the steps of establishing pressure within said lower chamber, determining the presence or absence of leakage from said lower chamber when the latter is submerged, determining the presence or absence of pressure in the upper chamber while maintaining said pressure in the lower chamber, establishing pressure in said upper chamber, and determining the presence or absence of leakage from said upper chamber when the latter is submerged.

In witness whereof, I have hereunto set my hand this 8th day of January, 1924.

JOHN T. LUCAS.